United States Patent [19]
Lampert

[11] 3,961,565
[45] June 8, 1976

[54] PISTON AND CYLINDER ASSEMBLY

[75] Inventor: Heinz Lampert, Buchs/SG, Switzerland

[73] Assignee: Fa. Werner Looser, Maschinenbau, Riedern, Switzerland

[22] Filed: Apr. 2, 1975

[21] Appl. No.: 564,296

[30] Foreign Application Priority Data
Apr. 9, 1974 Switzerland.......................... 4965/74

[52] U.S. Cl. ............................. 92/117 R; 92/165 R; 308/4 R
[51] Int. Cl.² .................... F01B 15//02; F16C 1/26; F16C 17/06
[58] Field of Search .......... 92/117 R, 117 A, 165 R; 91/207, 216 R; 308/4 R, 3 R

[56] References Cited
UNITED STATES PATENTS

| | | | |
|---|---|---|---|
| 679,421 | 7/1901 | Halsey................................ | 92/165 R |
| 1,289,795 | 12/1918 | Johnson................................ | 91/207 |
| 2,199,328 | 4/1940 | Baer et al........................... | 92/165 R |
| 3,089,680 | 5/1963 | Deve................................. | 92/117 R |
| 3,135,165 | 6/1964 | Ciallie............................... | 92/117 R |

Primary Examiner—Paul E. Maslousky
Attorney, Agent, or Firm—James E. Nilles

[57] ABSTRACT

An axially expandable and contractable cylinder and piston assembly is provided with an internal axially back and forth movable guide ring for the piston. Helical teeth or thread means at the outer periphery of the guide ring mesh with complementary helical teeth or thread means at the inner periphery of the piston, and helical teeth or thread means at the inner periphery of the guide ring are slanted oppositely to its outer helical teeth or thread means and mesh with complementary helical teeth or thread means on the cylinder.

6 Claims, 3 Drawing Figures

PISTON AND CYLINDER ASSEMBLY

BACKGROUND OF THE INVENTION

The invention relates to the construction and use of an axially contractable and expandable piston and cylinder assembly.

Such assemblies as heretofore developed and as heretofore used, for instance in slot presses for construction work, have the decided disadvantage, especially if they are of the so-called short stroke type, that the axial shift of the piston within the cylinder to precisely parallel positions cannot always be assured. Due to the axially relatively small contact areas between the piston and the cylinder, the piston is apt to become cocked and thereby cause various difficulties the worst of which is the jamming of the piston within the cylinder.

SUMMARY OF THE INVENTION

The object of the present invention is to provide a device of the above mentioned character whose ability to maintain the piston in precisely parallel shifted positions is greatly improved. To that end the invention contemplates to provide a cylindrical guide ring which is operatively interposed between the piston and cylinder components and which has at its inner and outer peripheries oppositely slanted helical teeth or thread means in mesh, respectively, with complementary helical teeth or thread means on the cylinder and piston components. In this manner the piston will be reliably shiftable to precisely paralleled axially adjusted positions within the cylinder.

For sealing purposes, if the device is to be incorporated in a pressure fluid operated lifting apparatus, conventional and commercially available sealing rings may be placed between the cylinder and piston components. They are not subject to particular loadings and excessive wear.

DRAWINGS

The foregoing and other objects and advantages of the invention will become more fully apparent from the following description of a preferred embodiment with reference to the accompanying drawing in which.

DESCRIPTION OF A PREFERRED EMBODIMENT

Figure 1:
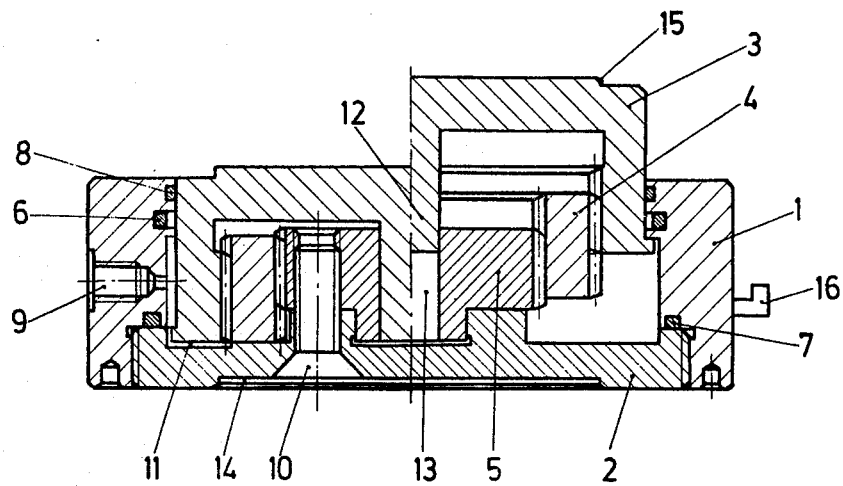
FIG. 1 is a dual section of a wafer type fluid press embodying the invention.

FIG. 1 shows a fluid operated slot press in section which comprises a ring shaped housing 1 with a screwed-in end cover 2. Within the cylinder formed by the housing 1 a piston 3 is axially movable back and forth. The left half of FIG. 1 shows the lowest limit position of the piston 3 and the right half of FIG. 1 shows the highest limit position of the piston. Nonrotatably connected with the housing cover 2 is an externally toothed or threaded ring 5. The ring 5 is provided at its outer periphery with a circular series of helical teeth or thread means, as for instance of screw-like profile. As a modification of FIG. 1, the cover 2 and the toothed or threaded ring 5 may be constructed as a one-piece unit. In the illustrated embodiment of the invention, the toothed or threaded ring 5 is nonrotatably secured to the cover 2 by means of at least one screw 10.

Figure 2:
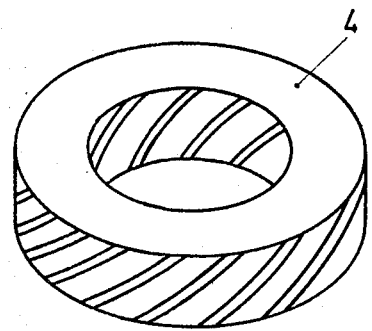
FIG. 2 is a perspective view of a guide ring incorporated in the device shown in FIG. 1.

Operatively interposed between the toothed or threaded ring 5 and the inner wall of the piston 3 is a cylindrical guide ring 4. This guide ring is provided at its inner periphery with helical teeth or thread means which mesh with complementary helical teeth or thread means of the toothed or threaded ring 5. The outer periphery of the guide ring 4 has a series of helical teeth or thread means which are slanted oppositely to the helical teeth or thread means at the inner periphery of the ring and which mesh with complementary helical teeth or thread means at the inner periphery of the piston 3. FIG. 2 shows the guide ring 4 of FIG. 1 in perspective. As clearly shown, the helical teeth at the inner and outer peripheries of the guide ring are slanted in opposite directions.

In order to provide equal moment areas for the intermeshing teeth between the guide ring 4 and the piston 3 as well as for the intermeshing teeth between the guide ring 4 and the toothed ring 5, these intermeshing teeth are either provided with equal pitches and different flank angles or with equal flank angles and different pitches. Although in principle any desired angular disposition of the helical teeth may be selected, it has been found that a flank angle of 45° with respect to the spiral axis is particularly desirable for the distribution of the moment areas and for good slide characteristics.

For the admission of a pressure medium into the housing 1, the latter is provided with a pressure medium inlet port 9 which leads via a channel 11 within the housing 1 or in the cover 2 to the outer helical teeth of the guide ring 4. In that area, the pressure medium passes through the intermeshing teeth into the space above the guide ring 4 where it pressurizes the inner end face of the piston 3.

The piston 3 is provided at its center with a stud 12 which is slideable back and forth within a recess 13 formed interiorly of the toothed ring 5. In this manner, the piston 3 and the toothed ring 4 are non-rotatably interconnected for axial back and forth movement relative to each other.

In order to prevent leakage loss of pressure medium, several sealing rings are provided, such as a sealing ring 7 between the cylindrical housing body 1 and the housing cover 2 and two sealing rings 6 and 8 between the housing body 1 and the piston 3. Admission of a pressure medium through the inlet port 9 pressurizes the inner end face of the piston 3. As a result, the piston is urged upward and forces the guide ring 4 some distance upward. During such upward movement, the guide ring is positively guided by the mesh of the two oppositely slanted rows of helical teeth or thread means, and as a result the upwardly moving guide ring 4 also positively guides the piston 3 axially upward relative to the toothed or threaded ring 5. In this manner, cocking of the piston 3 which ordinarily is not fully avoidable in short stroke cylinder and piston assemblies of this type, is in the present instance completely avoided. Due to the oppositely slanted helical tooth or thread means arrangement on the guide ring 4, the piston 3 is shifted to precisely parallel positions within the cylinder 1 upon axial displacement within the cylinder. Since the admitted pressure medium is passed via the channel 11 to the helical toothed or threaded connections, the pressure medium will also serve as a lubricant. The helical tooth or thread means connections are therefore well lubricated and the guide ring will have optimal slide characteristics.

The housing cover 2 is preferably provided with a circular recess 14 and the upper end face of the piston is provided with corresponding circular projection 15. Consequently, several of these devices may be stacked upon each other so that the obtainable maximum lift will be correspondingly multiplied.

The annular housing 1 is preferably equipped with a coupling device 16 for the purpose of connecting several of these devices side-by-side to each other. Upon simultaneous admission of pressure medium to the interconnected devices they will then act in parallel and consequently will have a power multiplying effect. Due to the described configuration of the device, it may be dismantled momentfree for servicing after relief of the pressure medium. Due to the described construction of the guide ring 4, no force moments react between the ring shaped housing body and the toothed or threaded ring 5 which would interfere with the assembly of the device.

The described device may be adapted by simple modifications for various uses. It may be used with particular advantage as a slot press in construction operations. With the aid of the device, considerable loads may be lifted or pressed apart without danger of the piston 3 becoming skewed or cocked within the housing 1.

This construction can be used for short piston/cylinder units or long piston/cylinder units equipped with teeth or with thread means.

Figure 3:
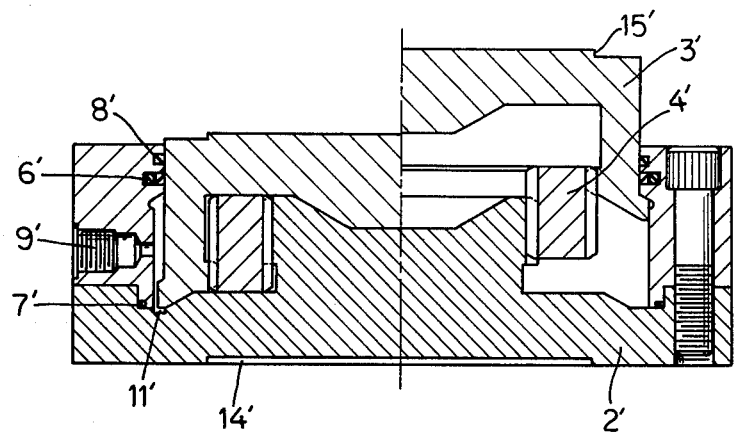
FIG. 3 is a view similar to FIG. 1 but showing a second embodiment of the invention.

FIG. 3 illustrates an embodiment of the present invention similar to that shown in FIG. 1 except that the housing cover 2 and the threaded ring 5, shown in FIG. 1 are constructed to comprise a single member 2'. The other elements of the structure shown are generally the same as those shown in FIG. 1 and are indicated by corresponding primed numbers.

I claim:

1. The combination of a cylinder component, a piston component axially reciprocable within said cylinder component, and a cylindrical guide ring operatively interposed between said cylinder and piston components, said guide ring being provided at its inner and outer peripheries with oppositely slanted thread means meshing respectively with complementary thread means on said cylinder and piston components.

2. The combination set forth by claim 1 wherein the thread means at the inner and outer peripheries of said guide ring have the same pitch and different flank angles.

3. The combination set forth by claim 1 wherein the thread means at the inner and outer peripheries of said guide ring have the same flank angles and different pitches.

4. The combination set forth by claim 1 wherein the guide ring is operatively interposed between the inner periphery of said piston component and an externally toothed annular element non-rotatably secured to said cylinder component.

5. The combination set forth by claim 4 wherein said externally toothed annular element and said cylinder component are constructed as a one-piece unit.

6. The use of the combination set forth by claim 1 as a pressure fluid operated slot press.

* * * * *